United States Patent [19]

Walker

[11] Patent Number: 4,919,969

[45] Date of Patent: Apr. 24, 1990

[54] METHOD OF MANUFACTURING A SEAL

[75] Inventor: Robin A. Walker, Tewkesbury, England

[73] Assignee: Dowty Seals Limited, England

[21] Appl. No.: 30,888

[22] Filed: Mar. 26, 1987

[30] Foreign Application Priority Data

Apr. 1, 1986 [GB] United Kingdom ................. 8607976

[51] Int. Cl.⁵ ........................ B05D 5/12; B05D 1/32; B05D 3/02
[52] U.S. Cl. ...................................... 427/58; 101/129; 277/901; 427/282
[58] Field of Search ................. 217/901; 427/282, 272, 427/58; 277/235 B; 101/129

[56] References Cited

U.S. PATENT DOCUMENTS

| 3,140,342 | 7/1964 | Ehrreich et al. | 277/901 X |
| 4,242,401 | 12/1980 | Mitani et al. | 427/282 X |
| 4,625,979 | 12/1986 | Inciong | 277/235 B X |

FOREIGN PATENT DOCUMENTS 1212839  11/1970  United Kingdom ............ 277/235 B

*Primary Examiner*—Evan Lawrence
*Attorney, Agent, or Firm*—Davis, Bujold & Streck

[57] ABSTRACT

A method of manufacturing a seal which involves printing seal material onto a substrate by printing a first layer of seal material onto the substrate with a stencil, printing a subsequent layer of seal material onto the substrate with a further stencil, and curing or partially curing the seal material, wherein the further stencil has a recess formed therein which accommodates the first layer of seal material printed onto the substrate.

6 Claims, 3 Drawing Sheets

METHOD OF MANUFACTURING A SEAL

This invention relates to seals and in particular to a method of manufacturing seals using a screen printing process.

The term seal being used herein includes all forms of seals or gaskets which may be formed using a printing process.

In a known method seals are manufactured by sequential screen printing of a material or materials on a base. A common problem with this type of process is that the depth of material deposited on the base is limited by the subsequent printing process operations.

If the depth of the material is not sufficient the seal will not perform adequately, and in addition the seal may not perform to its design capability.

Furthermore, when the seal is manufactured by a screen printing process, if the depth exceeds, for example, 0.1 mm the print quality can be detrimentally affected and at a depth greater than about 0.125 mm printing may not occur at all. This is because the screen will be held a corresponding distance away from the substrate, and it will be impossible to obtain adequate deflection of the screen.

According to the present invention there is provided a method of manufacturing a seal comprising the steps of (a) printing onto a substrate a first layer of seal material with a stencil;

(b) printing onto the substrate a subsequent layer of seal material with a further stencil;

(c) curing or partially curing the seal material;

characterised in that the further stencil has a recess pattern which accommodates the printed seal material.

The method may be used to print two, three, four or more layers of seal material on the substrate.

The curing or partial curing of the seal material may be carried out either after completion of the printing on the substrate or in between printing operations. Preferably, the method further comprises curing or partially curing the layer of seal material printed on the substrate, after the corresponding printing operations.

Curing may be carried out using any one of the known methods i.e. heating, radiation treatment or simply allowing the material to cure naturally. The curing method adopted will be dictated by the substrate and seal material used and, if intermediate curing is used, it may change from curing operation to curing operation.

The stencil or further stencil used with this method may be made from any one of the materials already employed for this purpose. The further stencil is provided with a recess pattern which accommodates printed seal material on the substrate upon which the stencil is to be used.

It is possible for the further stencil to be used in relation only to part of the surface of the seal, and therefore it would be correspondingly smaller in size. In this case, the recess pattern will only extend to the area of the substrate with which the stencil will be in contact.

In accordance with the invention is also included a stencil which has a recess pattern which accommodates the seal material previously printed on the substrate in relation to which the stencil is to be used.

By using a stencil having a recess pattern in the appropriate surface thereof, the problem of the stencil (printing screen) being held off of the substrate is alleviated. Consequently, in the present invention the seal as a whole may be printed with sufficient depth of material to ensure the seal will work fully to its design capability. In turn it will be possible to manufacture/design seals requiring two or more screen printing operations for uses where this would previously have not been possible.

The seal material or seal materials printed on the substrate may be any one or more of the previously used materials. In a preferred embodiment the seal material and/or any one or more of the seal materials is an elastically deformable material. In the case in which an elastically deformable material is deposited, it is preferred that one or more of the other printed materials, if present, is a relatively incompressible material.

One or more of the printed seal layers may be electrically conductive. In particular it is possible that relatively incompressible materials and/or the elastically deformable materials are electrically conductive. Any suitable conductive material may be used and is preferably a suitable base medium loaded with a material of high conductivity.

One of the layers of seal material printed in accordance with the method may be regarded as a mechanical stop. This may be an electrically conductive mechanical stop.

In the case where an electrically conductive mechanical stop is present the seal will normally present a first protuberance, for example a bead, of electrically conductive material and a second protuberance greater in depth than the first which acts in concert with the first.

The material for each bead can be selected to provide the properties required, the first material printed, for example, could be a relatively incompressible electrically conductive material intended to provide a seal against radio frequency interference or electromagnetic impulses and the second material printed for providing a mechanical seal. Alternatively the first material could be a relatively incompressible material to limit the compression of any other bead, and the second material could be an electrically conductive material to provide both a mechanical and an electrical interference seal.

In the case where the protuberances, for example stops, are included in the seal printing operation, it will be preferable to provide the relevant stencil or stencils with recesses to accommodate the stops. This is to prevent the protuberances from interfering with any subsequent printing operations.

It will be appreciated that the height of any previously deposited protuberance can be substantially the same as the height of a subsequent printed protuberance if any, the only limitation being that the depth of the recess for any previously deposited protuberance must always be slightly less deep than the thickness of the stencil pad in which the recess is formed.

Screen printing apparatus provided for manufacturing a seal in accordance with the method, previously described, comprises, a screen, a printing tool movable over the screen, and a stencil positioned relative to the underside of the screen.

The screen printing apparatus provided for manufacturing a seal in accordance with the method previously described, comprises a screen, a stencil positioned relative to the underside of the screen and a platen.

In the case, where the protuberances are to be printed onto the seal, the stencil includes recesses for previously applied protuberances, thereby allowing the stencil, in use, to be brought adjacent to the surface of the seal irrespective of the height or number of previously applied protuberances.

This invention will now be described by way of example with reference to the accompanying drawings in which.

Figure 1:
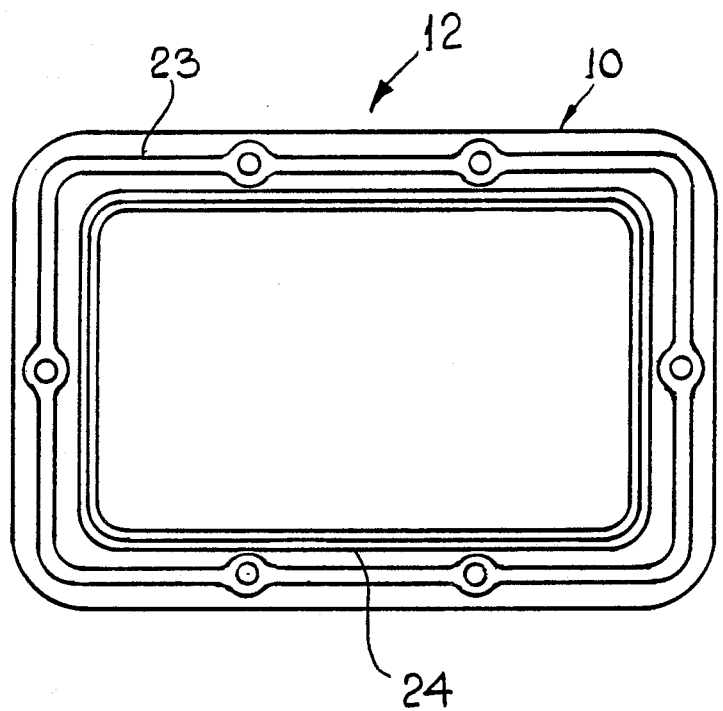
FIG. 1 is a plan view of a seal or gasket of the invention.

With reference to FIG. 1, a seal 12 comprises a substrate having a first bead 23 of a relatively incompressible polymeric material and a second bead 24 of an elastically compressible polymeric material.

In use, when sealing engagement is achieved with a surface (not shown), the second bead 24 is compressed against the surface until the first bead 23 contacts the surface. The first and second beads the second bead 24. Over compression of the second bead can therefore be avoided by design.

Figure 2:
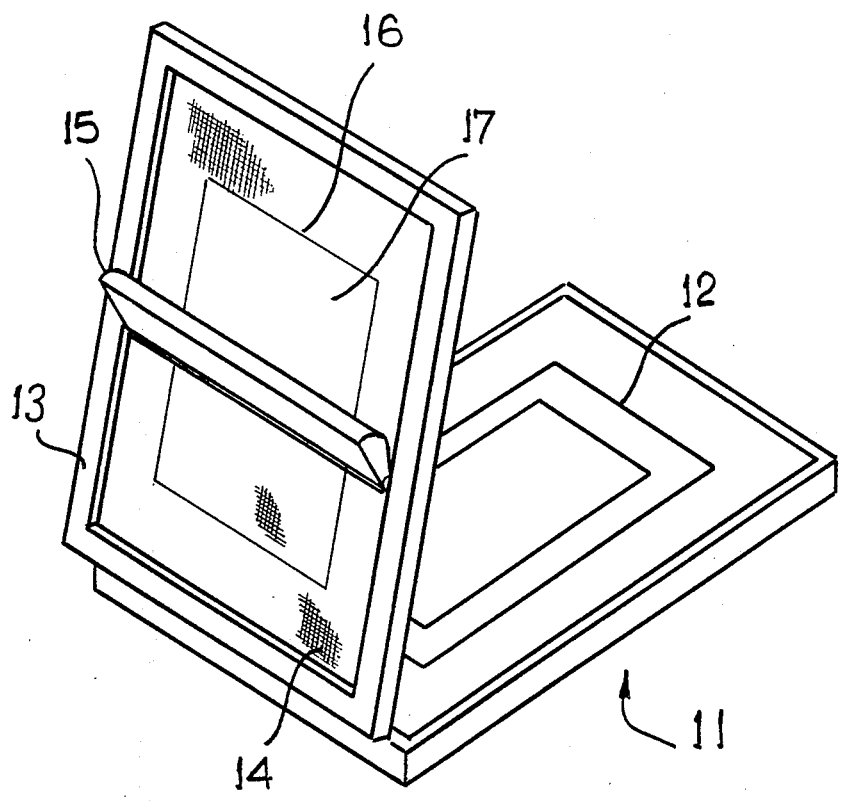
FIG. 2 is an isometric view of screen printing apparatus of the invention.
Figure 3:
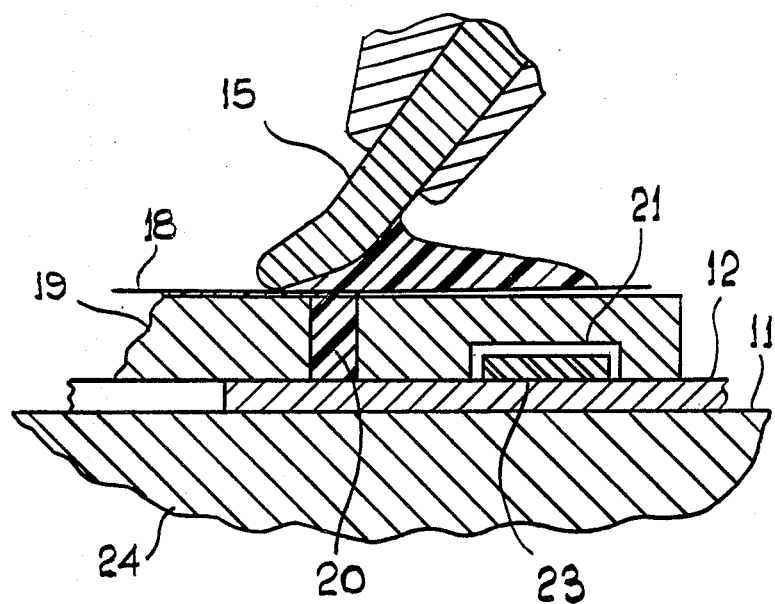
FIG. 3 is a cross-sectional view of the apparatus shown in FIG. 2.

Now referring to FIGS. 2 and 3 apparatus for manufacturing the seal 10, includes a platen 11, a frame 13 to support a first screen 14, a printing tool 15 movable relative to the frame 13, a first stencil 16 mounted on the underside of the first screen 14, a second screen 18 interchangeable with the first screen 14 and a second stencil mounted on the underside of the second screen 18.

Each of the screens 14, 18 comprises a piece of woven material held under tension by an associated frame.

The first stencil 16 is of similar thickness to the first bead 23 which is to be produced, and is formed with an aperture 17 corresponding to the shape and configuration of the first bead 23.

The second stencil 19 is of similar thickness to the second bead 24 which is to be produced and is formed with an aperture 20 corresponding to the shape and configuration of the second bead 24 and a recess 21 which corresponds to the shape and configuration of the first bead which is produced by the first stencil pad 16. The recess 21 is shaped so as to allow the first bead 23 to be easily accommodated therein.

In order to produce a seal using the apparatus, the substate 12 is positioned on the platen 11, and the frame 13 which contains the first screen 14 and stencil 16 is lowered into a position in which underside of the stencil 16 is adjacent to but not in contact with the substrate 12.

The relatively incompressible material of the first bead 23 is placed on the first screen 14 and carefully spread. The printing tool 15 is now moved across the screen 14.

The movement of the printing tool 15 across the first screen 14 forces the stencil 16 into contact with the substrate 12 and forces the material through the aperture 17 in the pad 16 and into contact with the substrate 12 to which it adheres. The screen 14 and the stencil pad 16 are then carefully raised leaving the first bead 23 on the substrate 12.

The material of the bead is cured and if required the substrate 12 is replaced on the platen 11 and a bead of the same material is printed and cured on the other side of the substrate 12 using a similar process.

Where a second printing of a similar material or a non identical printing of the same material are required screen 14 and the first stencil 16 are removed from the frame 13 and replaced by the second screen 18 and the second stencil 19. The substrate 12 is replaced upon the platen 11 and the frame 13 containing the second screen 18 with the attached second stencil 19 is lowered into position so as to bring the stencil 19 adjacent to the substrate 12. The previously deposited first bead is accommodated in the recess 21. A quantity of the elastically compressible material is placed on the second screen 18 and the printing tool 15 is used to spread the material across the second screen 18 and force some of the second material through an aperture 20 in the second stencil 19 onto the substrate 12 to which it adheres. The frame 13 is raised leaving a second bead material on the substrate 12. If a deposit of the second material is required on the other side of the substrate 12, after curing the first print of the second material, the substrate 12 is replaced upon the platen 11 and the procedure described above is repeated.

What is claimed is:

1. A method of manufacturing a seal which includes at least a first and a subsequent layer of seal material, which method comprises:
   (a) printing the first layer of seal material onto a substrate using a stencil;
   (b) printing the subsequent layer of seal material onto the substrate using a further stencil; and
   (c) curing, at least partially, the first and the subsequent layer of seal material printed onto the substrate;
   wherein the further stencil has a recess pattern formed in a surface thereof which co-operates with the substrate so as to accommodate the first layer of seal material printed onto the substrate.

2. A method of manufacturing a seal as claimed in claim 1 in which said curing comprises curing each layer of seal material after each layer is printed onto the substrate.

3. A method of manufacturing a seal as claimed in claim 1 further comprising using an elastically deformable material as at least one of the seal materials.

4. A method of manufacturing a seal as claimed in claim 1 further comprising using a relatively incompressible material as at least one of the seal materials.

5. A method as claimed in claim 1 further comprising using an electrically conductive material as one of the seal materials.

6. A method as claimed in claim 5, using a base medium loaded with a material of high conductivity as the electrically conductive material.

* * * * *